United States Patent [19]

Tyrrell

[11] Patent Number: 4,586,189
[45] Date of Patent: Apr. 29, 1986

[54] ASYNCHRONOUS TO SYNCHRONOUS DATA INTERFACE

[75] Inventor: Raymond E. Tyrrell, Raleigh, N.C.

[73] Assignee: ITT Corporation, New York, N.Y.

[21] Appl. No.: 580,905

[22] Filed: Feb. 16, 1984

[51] Int. Cl.[4] ............................................. H04L 25/38
[52] U.S. Cl. ...................................... 375/117; 370/48
[58] Field of Search ............... 375/106, 109, 110, 112, 375/117; 370/41, 48

[56] References Cited

U.S. PATENT DOCUMENTS

| | | | |
|---|---|---|---|
| 4,048,440 | 9/1977 | Peck et al. ........................... | 375/117 |
| 4,210,777 | 7/1980 | Bowerman et al. ................. | 375/117 |
| 4,225,960 | 9/1980 | Masters .............................. | 375/109 |
| 4,263,673 | 4/1981 | Bingham et al. .................... | 375/106 |

Primary Examiner—Jin F. Ng
Assistant Examiner—Stephen Chin
Attorney, Agent, or Firm—John T. O'Halloran; Jeffrey P. Morris

[57] ABSTRACT

A generalized data interface for transmission of asynchronous data from a transmitting terminal to a receiving terminal at a different transmission rate is described. In accordance with the present invention, the high data transmission rates normally associated with synchronous transmission are achievable between asynchronous data terminals using novel asynchronous to synchronous and synchronous to asynchronous converters.

6 Claims, 6 Drawing Figures

LOWER ASYNCHRONOUS TO HIGHER SYNCHRONOUS RATE CONVERSION

ASYNCHRONOUS AND SYNCHRONOUS RATES ARE IDEALLY EQUAL

Fig. 3  DSU AND UART REALIGNMENT CIRCUIT

UART CONFIGURATION

SWITCH 2

| 1 PI | 2 SBS | 3 WLS 2 | 4 WLS 1 | 5 EPE | NUMBER OF DATA BITS | PARITY BIT | NUMBER OF STOP BITS |
|---|---|---|---|---|---|---|---|
| 0 | 0 | 0 | 0 | 0 | 5 | ODD | 1 |
| 0 | 1 | 0 | 0 | 0 | 5 | ODD | 1.5 |
| 0 | 0 | 0 | 0 | 1 | 5 | EVEN | 1 |
| 0 | 1 | 0 | 0 | 1 | 5 | EVEN | 1.5 |
| 1 | 0 | 0 | 0 | X | 5 | NONE | 1 |
| 1 | 1 | 0 | 0 | X | 5 | NONE | 1.5 |
| 0 | 0 | 0 | 1 | 0 | 6 | ODD | 1 |
| 0 | 1 | 0 | 1 | 0 | 6 | ODD | 2 |
| 0 | 0 | 0 | 1 | 1 | 6 | EVEN | 1 |
| 0 | 1 | 0 | 1 | 1 | 6 | EVEN | 2 |
| 1 | 0 | 0 | 1 | X | 6 | NONE | 1 |
| 1 | 1 | 0 | 1 | X | 6 | NONE | 2 |
| 0 | 0 | 1 | 0 | 0 | 7 | ODD | 1 |
| 0 | 1 | 1 | 0 | 0 | 7 | ODD | 2 |
| 0 | 0 | 1 | 0 | 1 | 7 | EVEN | 1 |
| 0 | 1 | 1 | 0 | 1 | 7 | EVEN | 2 |
| 1 | 0 | 1 | 0 | X | 7 | NONE | 1 |
| 1 | 1 | 1 | 0 | X | 7 | NONE | 2 |
| 0 | 0 | 1 | 1 | 0 | 8 | ODD | 1 |
| 0 | 1 | 1 | 1 | 0 | 8 | ODD | 2 |
| 0 | 0 | 1 | 1 | 1 | 8 | EVEN | 1 |
| 0 | 1 | 1 | 1 | 1 | 8 | EVEN | 2 |
| 1 | 0 | 1 | 1 | X | 8 | NONE | 1 |
| 1 | 1 | 1 | 1 | X | 8 | NONE | 2 |

"0" = SWITCH ON
"1" = SWITCH OFF

Fig. 4

BAUD RATE SELECTION

| SWITCH 1 5 | 6 2 | 7 3 | 8 4 (DTE) (DSU) | BAUD RATE | FREQUENCY 16 X CLK (KHz) |
|---|---|---|---|---|---|
| 0 | 0 | 0 | 0 | 50 | 0.8 |
| 0 | 0 | 0 | 1 | 75 | 1.2 |
| 0 | 0 | 1 | 0 | 110 | 1.76 |
| 0 | 0 | 1 | 1 | 134.5 | 2.1523 |
| 0 | 1 | 0 | 0 | 150 | 2.4 |
| 0 | 1 | 0 | 1 | 300 | 4.8 |
| 0 | 1 | 1 | 0 | 600 | 9.6 |
| 0 | 1 | 1 | 1 | 1200 | 19.2 |
| 1 | 0 | 0 | 0 | 1800 | 28.8 |
| 1 | 0 | 0 | 1 | 2000 | 32.081 |
| 1 | 0 | 1 | 0 | 2400 | 38.4 |
| 1 | 0 | 1 | 1 | 3600 | 57.6 |
| 1 | 1 | 0 | 0 | 4800 | 76.83 |
| 1 | 1 | 0 | 1 | 7200 | 115.2 |
| 1 | 1 | 1 | 0 | 9600 | 153.6 |
| 1 | 1 | 1 | 1 | 19200 | 316.8 |
| DSU ONLY | | | | 56000 | 896.0 |

"0" = SWITCH ON
"1" = SWITCH OFF

ASYNCHRONOUS TO SYNCHRONOUS DATA INTERFACE

BACKGROUND OF THE INVENTION

1. Field of the Invention

The present invention relates to an improved data transmission system in which asynchronous data can be transmitted over long distances at rates heretofore used for short distance asynchronous or long distance synchronous transmission.

2. Description of the Prior Art

Asynchronous to synchronous data conversion circuitry of the prior art is generally limited either by the asynchronous data rates, the synchronous data rates, particularly character formats, or by the capability in the number of asynchronous characters which can be transmitted end-to-end continuously. Furthermore, these asynchronous-to-synchronous converters of the prior art are external devices requiring additional data cabling and in many instances, power cabling.

Asnychronous data transmission of the prior art has generally been limited to data rates of 1300 bits per second or less over voice grade telecommunication transmission lines. At present, data terminals have been designed to operate asynchronously at higher data rates i.e., at 2400 bits per second, 4800 bits per second and 9600 bits per second; which rates were previously used only for synchronous data transmission.

A problem associated with the aforementioned high asynchronous data rates is loss of synchronization and errors in data transmission when such high speed asynchronous data terminals are located remotely from the data processors with which they must communicate. This has resulted in the prior art in the use of data rates of 1800 bits per second or less for high speed asynchronous data transmission whenever such transmission is required generally over distances greater than several hundred feet.

Asynchronous-to-synchronous converters are well known and are commonly used for data transmission rates for 2400 bits per second or higher. Such prior art converters interface asynchronous data terminals to synchronous modems or other equipment which operates at the same or higher data rates. In such converters, characters are recognized based upon the start bits in the asynchronous data transmission, the characters are temporarily stored in a memory and are serially transmitted together with start/stop bits to a synchronous transmission modem using the synchronous clocks from the modem.

Where it is desired to perform a data rate conversion between a higher synchronous data rate and a lower asynchronous data rate, the steps described in the immediately preceeding paragraph are performed in reverse sequence at the receiving modem. When a data rate conversion is not required, the received synchronous transmission from the modem can be transmitted directly to an asynchronous data terminal.

SUMMARY OF THE INVENTION

A generalized data interface for transmission of asynchronous data from a transmitting terminal to a receiving terminal at a different transmission rate is described. In accordance with the present invention, the high data transmission rates normally associated with synchronous transmission are achievable between asynchronous data terminals using novel asynchronous to synchronous and synchronous to asynchronous converters.

BRIEF DESCRIPTION OF THE DRAWINGS

FIG. 4 is a state diagram of the universal asynchronous receive/transmit controller (UART) of FIG. 2.

FIG. 5 is a state diagram of the baud rate generator of FIG. 2.

DESCRIPTION OF THE PREFERRED EMBODIMENT

Figure 1A:
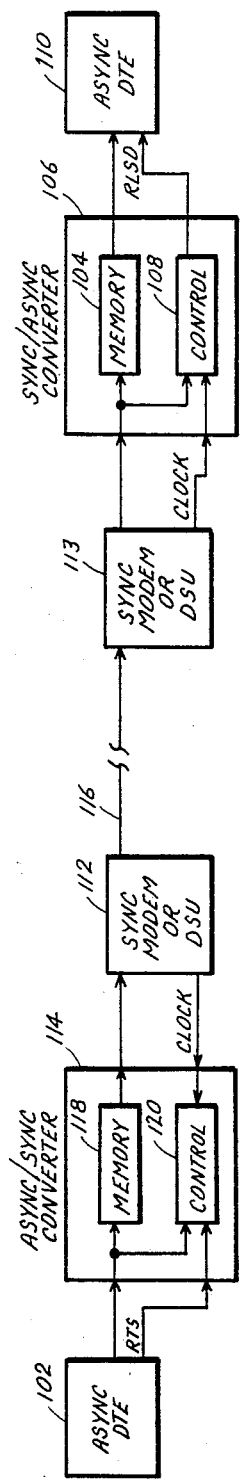
FIG. 1A is illustrative of a generalized transmission system in which a lower asynchronous data rate is converted to a higher synchronous data rate.

In the generalized prior art, low asynchronous to higher synchronous rate conversion transmission system illustrated by FIG. 1A generally at 100, when the data transmission rate of the transmitting asynchronous data terminal equipment 102 is slightly higher than the rate at which data is extracted from the receiving converter memory 104 at the far end, then a memory buffer, larger than one (1) character is required at the far end synchronous to asynchronous converter 106. The buffer may be included as a part of control circuitry 108 for the memory 104. The size of the memory buffer dictates a number of asynchronous characters which can be transmitted continuously. Also, as a result of the data delay created by the receiving converter memory 104, an equal delay must be placed on the control signal from control 108 to the asynchronous detector terminal 110.

Modems 112 and 113 may be conventional RS232 modems or ITT Telecom Data Service Units which interface the synchronous to asynchronous converter 104 and the asynchronous to synchronous converter 114 to a transmission line 116 asynchronous to synchronous converter 114 includes a memory 118 and control 120.

Figure 1B:
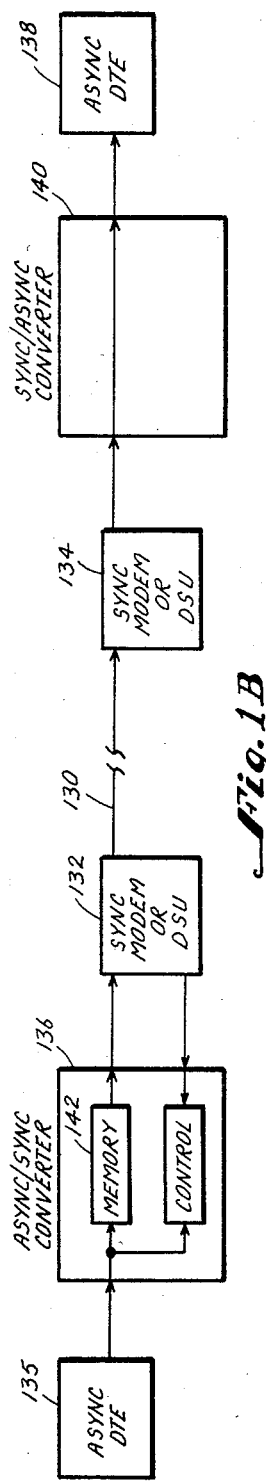
FIG. 1B is illustrative of a generally known data transmission system of which the asynchronous and synchronous/data transmission data rates are equal.

With reference to FIG. 1B, a simplified known transmission scheme is illustrated in which the asynchronous and synchronous transmission rates are equal over a transmission line 130 which connects to transmission modems 132 and 134.

In such a system, asynchronous data from a terminal 134 is converted to synchronous data by asynchronous to synchronous converter 136. The received synchronous data can be coupled to an asynchronous data terminal 138 without further processing at synchronous to asynchronous converter 140. When the synchronous transmission rate of the modem 132 is slightly less than the asynchronous transmission rate of the data terminal 135, a memory buffer at converter 136 larger than one character is required. The size of the memory buffer dictates the number of asynchronous characters which can be transmitted continuously.

As a result of the data transmission delay created by the memory buffer, an equal delay must be placed on the request to send signals from the asynchronous data terminal 135 to the synchronous modem 136, otherwise, data will be left in the memory 142 when the modem terminates transmission.

Figure 2:
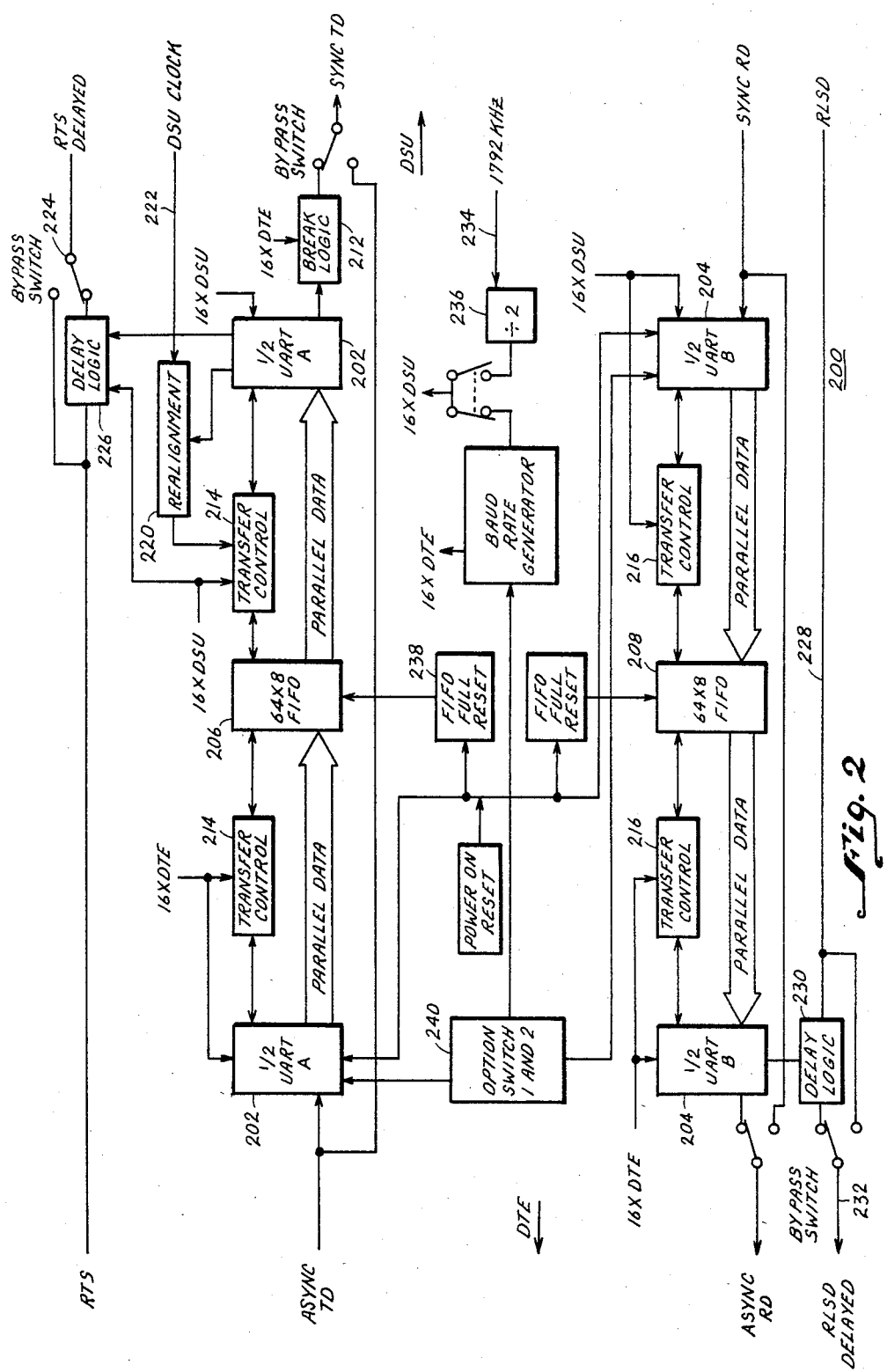
FIG. 2 is an asynchronous data interface circuit in accordance with the present invention.

Referring now to FIG. 2, a block diagram of the present invention is illustrated generally at 200. The hereinafter described asynchronous data service unit interface system performs all of the functions of heretofore described circuitry of the asynchronous to synchronous and synchronous to asynchronous converters and modems of the prior art as described with reference to FIGS. 1A and 1B. In accordance with the present invention, large scale integrated circuit devices are utilized which include a Universal Asynchronous Receive/Transmit Controller (UART) dual baud rate generator (BRG) and a first-in first-out (FIFO) memory. The UART may, for example, be a Western Digital component TR1865. The UART is used in accordance with the present invention, to perform both a baud rate conversion and a clock realignment. The asynchronous interface to the transmission line uses two UART devices 202 and 204 to implement the asynchronous to synchronous data and synchronous to asynchronous conversion. FIFO memories 206 and 208 are used in the transmit and receive directions respectfully to absorb clock variations between the data terminal equipment, any interface equipment and the illustrated circuitry. A dual baud rate generator 210 provides the required 16 times clocks for the UART devices 202 and 204 as well as the basic driving clock for digital clock alignment-/control circitry, data break detect logic 212, data transfer control 214 in the transmit direction and data transfer control 216 in the receive direction, and delay logic 226. The UART circuits 202 and 204 and the baud rate generator 210 are programmable via switches in accordance with the tables hereinafter described with reference to FIGS. 3 and 4.

UART's 202 and 204 provide the basic circuit element for the required conversion and "detect" functions as well as providing all of the basic stop/start character requirements. Dual baud rate generator 210 is configured to permit use of all of the common asynchronous data rates from 50 bits per second to 9200 bits per second, as well as simplifying the data rate conversion function via the dual baud rate generators in one device. FIFO memory 208 comprises the basic memory element for a 512 bit memory buffer, which exceeds the required number of asynchronous characters envisioned which may be transmitted continuously end to end.

In transferring data from the UART 204 or UART 202 to the asynchronous to synchronous conversion circuitry of FIG. 2, the alignment control circuit 220 and 214 detects when clock slips between the asynchronous clock on line 222 and the baud rate generator clocks from baud rate generator 210 are about to occur, and realigns the asynchronous data stream relative to the clock on line 222. The foregoing eliminates the need for standard phase lock loop oscillators and divider chain circuitry for deriving a UART clock which is synchronous to the internal system unit data rate clock on line 222. By closing the bypass switch 224, the system will operate as a synchronous RS232C interface.

The Asynchronous DSU Interface operation, will be described with reference to the case of the asynchronous DTE operating at a data rate less than the synchronous DSU data rate of, for example, 4800b/s to 9600b/s, and second to the case of the asynchronous DTE and synchronous DSU operating at the same ideal data rate of, for example, 9600b/s to 9600b/s. The following description is in reference to one direction of transmission only.

EXAMPLE ONE —DTE RATE LESS THAN DSU RATE

For this first example, asynchronous data enters the receiving half of UART 202. It is clocked in by the "16×DTE" clock from the baud rate generator 210 until the Stop bit is detected. At this point the UART raises a flag to the transfer control which parallel loads the received character from the UART 202 to the FIFO 206, if the FIFO's 'input ready' flag is present. The 'input ready' flag indicates that the FIFO is not full. With data being taken out on the synchronous side much faster [9600b/s] than it is put in [4800b/s], the 'input ready' flag will always be present for a parallel load. Also note that the parallel character from the UART has been stripped of Start, Parity, and Stop bits.

The character ripples through the FIFO 206 to the parallel output, raising the FIFO's 'output ready' flag. The transfer control recognizes the 'output ready', in conjunction with the already raised 'transmit holding register empty' [THRE] flag of the transmitting half of UART 'A', and loads the character into the UART. Again in this case, with the synchronous data rate faster, the THRE flag will always be present for a parallel load to the UART.

The alignment circuit 220 will start a realignment sequence if the transmitting half or UART 202 has both the THRE and 'transmit register empty' [TRE] flags raised or if it counts 128 characters loaded since the last time the TRE flag was raised. Again, with the synchronous rate faster, both THRE and TRE flags will be raised before the next character can be loaded. The end result is a realignment between every character.

Figure 3:
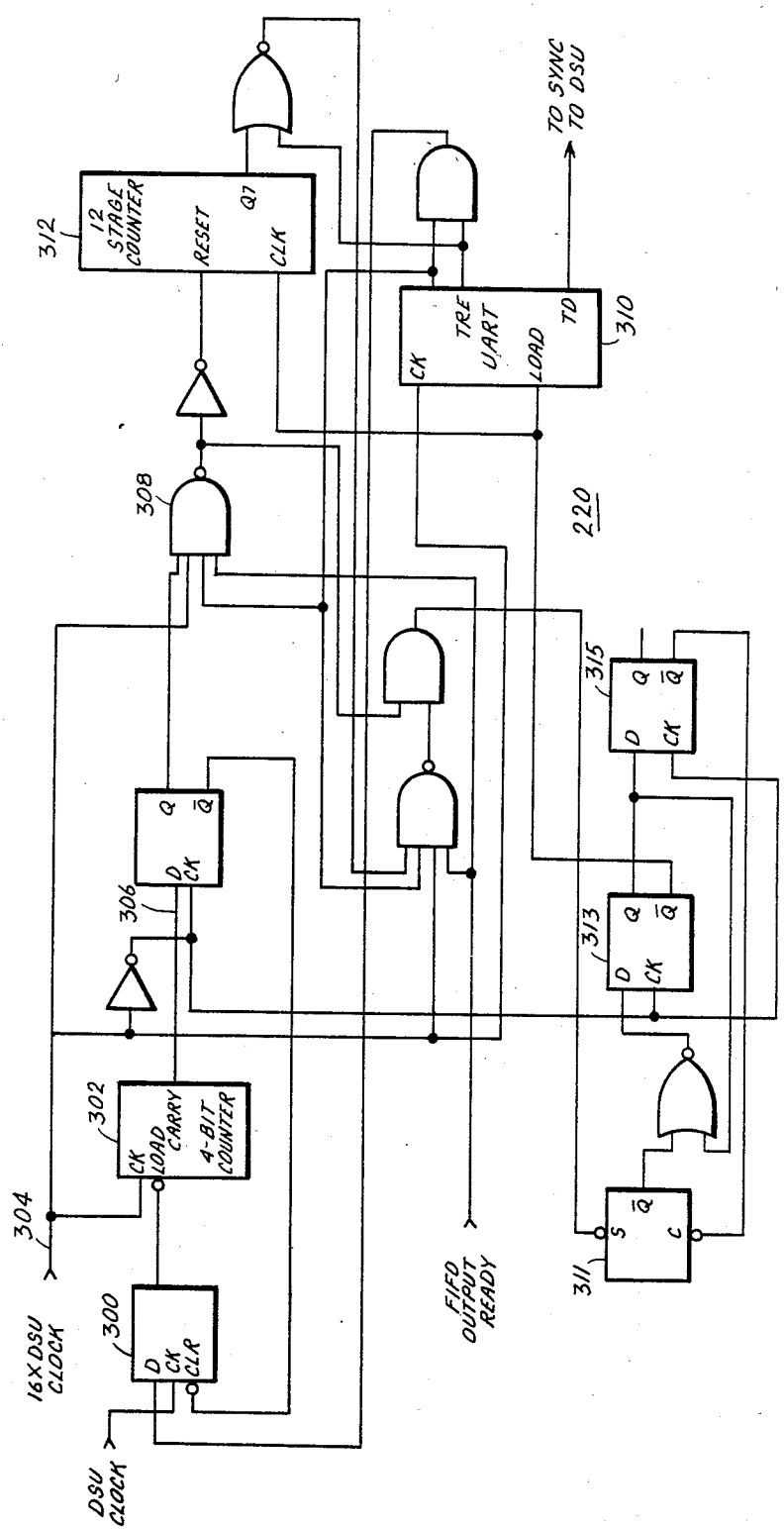
FIG. 3 is a realignment circuit utilized in connection with the circuit of FIG. 2.

Referring now to FIG. 3, the realignment circuitry 220 is described in detail.

When the realignment process is started, all character loads to UART 202 are inhibited. If the THRE and TRE flags are raised, they are AND'ed together and placed on the 'D' input of a D Latch 300 which is clocked by the inverted DSU clock with a 50% duty cycle. On the next DSU clock edge, the D Latch 300 drops the 'Load' input on a 4-bit counter 302 which has been continuously loaded with a count of ten. The counter, which is driven by a BRG clock on line 304 that is sixteen times the DSU clock, counts five clock edges and generates a Carry Out on line 306. The Carry Out is reclocked ½ clock later. The reclocked Carry Out is AND'ed at AND gate 308 with the THRE flag of UART 'A' the 'output ready' flag of the FIFO, and the sixteen times DSU clock to set a latch ½ clock later. Again ½ clock later the set latch output is reclocked to produce the strobe which loads the next character into the UART 310. The UART 310, which is also driven by the sixteen times DSU clock, takes 2 ½ clocks before it shifts out the first character bit. The end result is that the UART 310 serial output has been allowed to start eight clocks [16×DSU] after detection of the inverted DSU clock and the noninverted DSU clock edge will occur near the center of the UART transmitted Start bit with a possible error of plus one 16×DSU clock.

In continuing the first example, after realignment, the character is serially shifted out of the transmitting half of UART 202 into the DSU where it is clocked in with the DSU clock and transmitted to the receiving DSU over, for example, a digital dataphone service network.

At the receiving DSU, the character is serially shifted in to the receiving half of UART 204. After shifting in the character, the UART 204 raises the 'data ready' flag. The transfer control clocks in the 'data ready' flag with the sixteen times DSU clock, which drives the receive half of UART 204, and generates a 'strobe in' to the FIFO 208. This same 'strobe in' clocks a latch which detects the 'input ready' of the FIFO 208. If the FIFO 208 input is not ready the FIFO is reset under the assumption that the FIFO is full and an overflow is about to occur. Given that the 'input ready' flag is raised, the character is parallel loaded into the FIFO and ripples through to the output, raising the FIFO 'output ready' flag. Using a clock which is sixteen times the DTE data rate, the transfer control 216 generates a parallel load strobe to the transmitting half of UART 204 if both the FIFO 208 'output ready' and the UART 204 'THRE' flags are raised. Next the UART 204 appends the Start bit, Parity bit if programmed, and the number of stop bits programmed then serially shifts the character out using the 16×DTE BRG clock.

In this first example, where the DTE asynchronous data rate is less than the synchronous data rate [i.e. 4800b/s to 9600b/s], the FIFO will start to fill if the transmitting DTE is operating at a data rate which is slightly higher than the rate at which the transmitting half of UART 204 is shifting data out [i.e. −4902b/s to 4800b/s] and the characters are continuous. The number of characters which can be transmitted continuously can be calculated given the rate difference between the clocks of the transmitting DTE and the BRG 210 (which drives the transmit half of UART 204 at the receiving interface), and the FIFO 208 memory size. As an extreme example, assume a DTE clock tolerance of 1%, the BRG clock tolerance of 0.015%, and a FIFO memory capable of storing 66 characters (including two holding registers in UART's).

$$\text{then, } x = \frac{66}{1.015\%} = 6502 \text{ characters continuous}$$

The FIFO at the receiving UART will be reset as mentioned earlier after receiving approximately 6502 characters continuously.

EXAMPLE TWO —DTE RATE THE SAME AS DSU RATE

As mentioned before, the second example of detailed description involves DTE with the same data rate as the DSU (i.e. 9600b/s to 9600b/s). As before, the asynchronous data character enters the receiving half of UART 202. It is clocked in by the "16×DTE" clock from the BRG 210 until the Stop bit is detected. At this point the UART 202 raises a flag to the transfer control which parallel loads the received character (Start, Stop Parity bits removed) from the UART 202 to the FIFO 206, if the FIFO's 'input ready' flag is present.

If the 'input ready' flag is not present, the FIFO 206 will be reset by FIFO full reset circuit 238 under the assumption that the FIFO is full and an overflow is about to occur.

After loading to the FIFO, the character ripples through to the parallel output, raising the FIFO's 'output ready' flag. The transfer control recognizes the FIFO 'output ready' and the THRE flag from the transmitting half of UART 202 to parallel load the character into the UART. If a realignment is in process, the THRE flag will be blocked, preventing a parallel load.

As aforementioned, the realignment process will start if the transmitted half of UART 202 has both the THRE and TRE flags raised or if 128 characters have been counted since last detecting the TRE flag raised. The 128 caracter count is the possible number of bits which can be transmitted between the DSU and BRG clock slips without error when transmitting continuous characters. It is based on the following. Given that on the Start bit almost one cycle of the sixteen times clock can be lost at the sampling start, then over a period of N bits the cumulative error must not exceed 7/16 of the basic clock cycle.

$$7/16 = N \times \text{Error}$$

Given the worse case character length, 12 bits.

1944/12 = 162 characters which is greater than 128

The realignment process, as previously described in the first example description of the asynchronous data rate being less than the synchronous data rate, can require a maximum of 1.66 clock cycles at the synchronous data rate to complete. Repeated every 128 characters and assuming the worst case of 7 bit characters, this process repeats every 896 bits. This appears as a slowing of the BRG clock at the transmitting UART 202 and equates to an extreme worst case of 0.10% clock discrepancy (1.66/896=0.00185). Assuming the realignment process on the average takes 1 clock cycle, typically the clock discrepancy will be around 0.1%.

The BRG has a clock tolerance of 0.015%. The realignment process adds a −0.1% clock discrepancy to the BRG. This means that the transmitting UART 202 half could be transmitting characters to the DSU −1.115% less than the ideal data rate. Assuming that the asynchronous DTE data rate is 1% higher than the DSU synchronous data rate, then the total clock difference between the asynchronous DTE and synchronous DSU could appear to be −1.115%. The end result is that the FIFO memory will start filling based on the −1.115% clock difference. Therefore the number of characters which can be transmitted continuously should be approximately $$66/1.115\% = 5739 \text{ characters continuous}$$

In continuing the second example description, the character is loaded into the transmitting half of UART 202, where the Start bit, Stop bit, and Parity bit (if optioned) are added and then serially shifted into the DSU where it is clocked in with the DSU clock and transmitted to the receiving DSU over the DDS network.

At the receiving DSU, the character is serially shifted into the receiving half of UART 204. After shifting in the character and removing the Start, Stop, and Parity bits, the UART 204 raises the 'data ready' flag. The transfer control circuit 216 generates a strobe which parallel loads the character into the FIFO. The character ripples through to the output raising the FIFO 'output ready' flag. The transfer control circuit 216 generates a parallel load strobe to the transmitting half of UART 204 if both the FIFO 'output ready' and UART 'THRE' flags are raised. Next the UART appends the Start bit, Parity bit (if programmed), and the number of Stop bits programmed, then serially shifts the character out using the 16×DTE BRG clock.

The FIFO 'input ready' flag and 'THRE' flag of the transmitting half of UART 'B' will always be present in this case. The delay created by the realignment at the transmitting DSU, 0.1% will always be greater than delay of the BRG 16×DTE clock provided to the transmitting half of UART 204, which is 0.015%. Thus the characters at the receiving interface FIFO will always be taken out quicker than they are put in.

The break detect circuit 212 function will now be described. The break detect function is accomplished by using the framing error output of the receiving half of UART 202. During a break operation continuous zeros are sent from the asynchronous DTE to UART 202. Lasting over the transmission period of many characters, UART 202 will generate a framing error output, not having seen a Stop bit. When the framing error output goes active, the reset to a 12 stage counter 312 associated with the realignment circuit of FIG. 3 is clocked by the BRG 16×DTE clock. Given that the framing error output does not go inactive, the counter will count to 512, which blocks further counting and causes the serial transmit output of UART 202 to go to all zeros. The 512 count guarantees that the framing error has existed for over 3 characters.

When the UART 202 receives a mark input or the first "one" bit in a character, the framing error output will go inactive, the counter will be held reset, and the UART '202' transmit output will be returned from an all zero output.

The Request to Send logic signal from the asynchronous data terminal to the synchronous terminal is effected by RTS delay logic 226 which is described as follows:

The DTE 'RTS' input must be delayed to the DSU to guarantee that when the DTE drops 'RTS' no data remains in the UART's or FIFO. This function is accomplished by ORing the FIFO 'output ready' active state and the inactive states of the transmitting UART '202' outputs 'TRE' (transmit register empty) and 'THRE' (transmit holding register empty) with the DTE 'RTS'. No output from the receiving half of UART '202' is required because the parallel character output is always loaded to the FIFO and the FIFO 'output ready' raised before the last half of the Stop bit has been received.

The receive line signal detect (RLSD) on line 228 is coupled to delay logic 230 to obtain a RLSD signal on line 232.

The DSU 'RLSD' output must be delayed to the DTE to guarantee that when the DSU drops 'RLSD' no data remains in the UART's or FIFO. This function is accomplished by ORing the inactive states of the transmitting half of UART '204' outputs 'TRE' and 'THRE' with the DSU 'RLSD'. This is possible because at the data rates UART '204' is transmitting at, the transmit holding register may empty but any character in the received half of UART '204' or the FIFO will be loaded before the transmit register can shift out the previous character.

The 1792 KHz clock on line 234 is divided by 2 by a divide-by-two circuit 236. When the DTE is operating at a data rate of 19.2 KHz the required clock for the DSU side of the UART's is 16×56 KHz. The BRG 210 cannot supply this clock. The DSU supplies a nonsymmetrical 1792 KHz clock, which is divided by two and optioned in by a switch 240 to provide the required 896 KHz clock.

Referring now to FIG. 4, a table of UART 202 and 204 switch configurations is illustrated which is programmable in accordance with described UART characteristics, and is exemplary only. Each UART switch includes an eight position dual-inline-pin-switch (DIP). With respect to switch 2 of option switch 240, 5 of 8 switch positions are used as indicated in the table. Switch position 1 is used for pariety inhibit, switch position 2 for stop bit select, switch position 3 for word length select-2, switch position 4 for word length select-1 (of a 2 bit code) and switch position 5 is used for even parity enable.

Referring again to FIG. 3, flip-flops 311, 313, and 315 comprise a circuit used for loading characters into UART 310, which can also be utilized, for example, as UART202 in FIG. 2.

Referring now to FIG. 5, an exemplary baud rate generator 210 switch selection table is illustrated. This table relates to switch 240 positions of the DTE and DSU to the various transmission baud rates for various transmission frequencies.

I claim:

1. A data transmission system comprising:
    a source of asynchronous data at a source clock rate for transmission of a serial bit stream of characters including start/stop bits to a remote destination of asynchronous data;
    asynchronous to synchronous data conversion means for alinging the asynchronous data at the source clock rate to a synchronous clock at a different rate for serial synchronous transmission wherein said start/stop bits are extracted and reinserted prior to transmission to said remote asynchronous destination such that no data characters are lost in the data stream including said start/stop bits wherein said means includes a UART (Universal Asynchronous Receiver/Transmit) for performing a baud rate conversion and a clock alignment; and
    synchronous to asynchronous data conversion means for coupling said synchronously clocked data stream asynchronously at a desired transmission rate to said remote destination of asynchronous data;
    wherein the asynchronous transmission rate is substantially equal to or lower than the synchronous data transmission rate.

2. A data transmission system in accordance with claim 1
    wherein said asynchronous to synchronous conversion means includes:
    realignment circuit means for sensing an internally generated clock and synchronizing the source clock to a selected internally generated clock only when said internally generated clock is selected, and means for inhibiting transmission of characters until said clocks are aligned.

3. A data transmission system in accordance with claim 2 further including:
    FIFO memory means for storing current data characters during realignment to prevent loss of data.

4. In a data transmission system for the synchronous transmission of asynchronous data to an asynchronous data receiver;
    a source of asynchronous data at a source clock rate for transmission of a serial bit stream of characters including start/stop bits to said asynchronous data receiver; and
    asynchronous to synchronous data conversion means for aligning the asynchronous data at the source clock rate to a synchronous clock at a different rate for serial synchronous transmission wherein said start/stop bits are extracted and reinserted prior to transmission to said asynchronous data receiver such that no data characters are lost in the data stream which at said receiver including said start/stop bits and wherein said conversion means includes a UART (Universal Asynchronous Receive/Transmit) for performing a baud rate conversion and a clock alignment;

wherein said system is adapted so that the asynchronous data transmission rate is lower than or is substantially equal to the synchronous data transmission rate.

5. In a data transmission system in accordance with claim 4 wherein said asynchronous to synchronous data conversion means further includes:

realignment circuit means for sensing an internally generated clock and synchronizing the source clock to a selected internally generated clock only when said internally generated clock is selected, and means for inhibiting transmission of characters until said clocks are aligned.

6. In a data transmission system in accordance with claim 5, further including:

FIFO memory means for storing current data characters during realignment to prevent loss of data.

* * * * *